Jan. 29, 1935. L. G. GATES 1,989,092
BRAKE OPERATING MECHANISM
Filed Sept. 1, 1931

INVENTOR,
Leroy G. Gates
BY Booth & Booth
ATTORNEYS.

Patented Jan. 29, 1935

1,989,092

UNITED STATES PATENT OFFICE 1,989,092

BRAKE OPERATING MECHANISM

Leroy G. Gates, Bakersfield, Calif.

Application September 1, 1931, Serial No. 560,552

3 Claims. (Cl. 188—77)

The present invention relates to friction brakes, and more particularly to mechanism for applying and releasing the same. It may have its greatest use in connection with the brakes of hoisting apparatus, but its ready adaptation to other forms of braking devices will be apparent to those skilled in the art.

The principal object of the invention is to provide a brake which is easy to apply and which is not subject to kick-back of the operating lever upon the reversal of the drum, and which cannot be loosened or rendered less effective by such reversal. Other objects and advantages of the invention will be apparent from the following description, which should be read with the understanding that the form, construction and arrangement of the several parts may be varied, within the limits of the claims hereto appended, without departing from the spirit of the invention.

A simple form of mechanism illustrative of the principles of the invention will now be described fully with reference to the accompanying drawing, wherein:—

Figure 1:
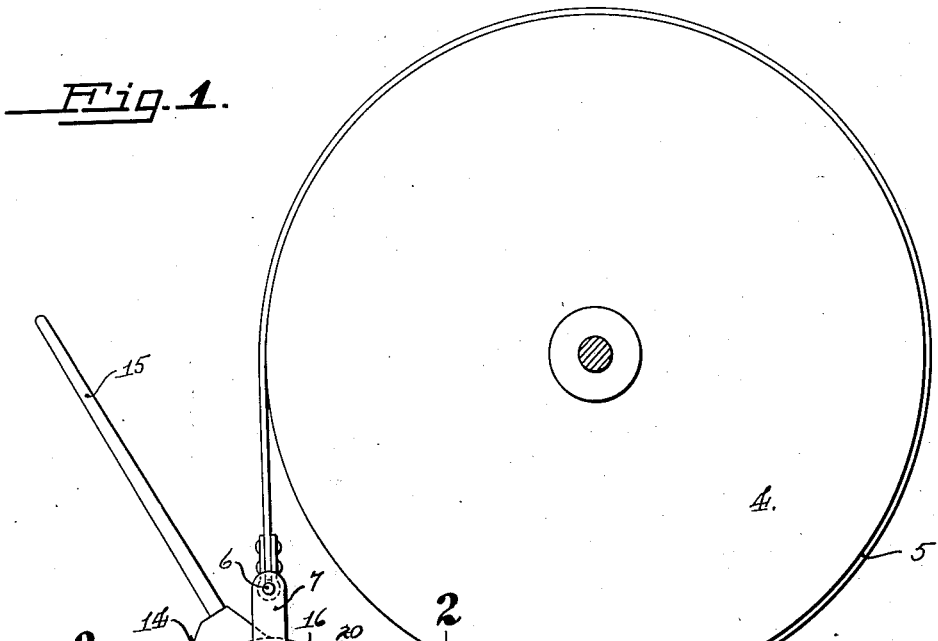
Fig. 1 is a side elevation of a band-type brake operated by my improved mechanism.
Figure 2:
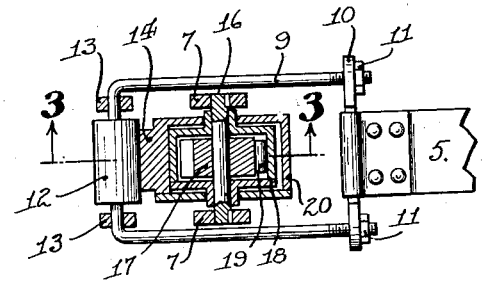
Fig. 2 is a horizontal section on the line 2—2 of Fig. 1, the portions below the plane of section being omitted for the sake of clearness.

My invention belongs to the type of brake in which friction is introduced in the movement of the operating mechanism to assist the leverage of said mechanism in resisting reaction of the braking member, i. e., in preventing kick-back. In some hoisting operations, such for example, as those involved in deep well drilling, the loads handled by the hoist of draw-works are so great that the brake, in order to be effective and still be within the ability of one man to operate, must have the maximum efficiency possible. Hoists of this kind, moreover, are subject to reversal of direction of rotation, and, unless means are provided for preventing such reversal from affecting the operating lever, the brake is apt to be loosened or kicked out of the operator's control, with consequent likelihood of disastrous results. In my improved brake, the operating lever can be moved easily in one direction to apply the brake, but its movement in the other or releasing direction is impeded by means which come into play automatically without additional movement or attention on the part of the operator.

Referring more particularly to the drawing, the reference numeral 4 indicates a drum which constitutes the moving member of the brake, and 5 is a band surrounding said drum and forming the shoe or retarding member. One end of the band 5 is attached at 6 to a pair of spaced standards 7 fixed to the floor or frame 8 of the hoist. The other end of the band is adjustably secured to a U-shaped horizontal yoke 9 by means of a crosspiece 10 and nuts 11, the latter forming convenient means for adjusting the tension of the band. The central or transverse portion of the yoke 9 carries a roller 12, and is pivotally supported for free horizontal movement by links 13 rising from the base 8.

The oscillating cam 14 is mounted between the standards 7, and is adapted for engagement with the roller 12. An operating member or lever 15 is secured to the cam 14. Therefore, by swinging the lever 15 downwardly, the roller 12 and yoke 9 are moved horizontally toward the left to tighten the band 5 about the drum 4, and by moving said lever upwardly, the band is released. The profile of the cam 14 can be so formed as to provide the desired amount of leverage for the brake.

Figure 3:
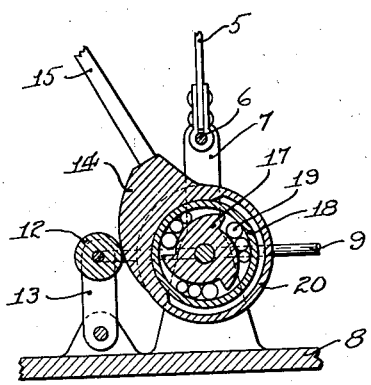
Fig. 3 is a vertical section on the line 3—3 of Fig. 2.

Means for impeding the upward or releasing movement of the lever 15 are provided preferably within the mounting or bearing of the cam 14. A rigidly fixed shaft 16 extends between the standards 7 and carries a ratchet or roller clutch member 17. A sleeve 18 surrounds said clutch member 17 and is freely rotatable thereabout in one direction i. e. counter-clockwise, as viewed in Fig. 3, but is prevented from rotation in the other direction by wedging rollers 19. The cam 14 is secured to a sleeve or housing 20 surrounding the sleeve 18, and bearing thereupon for at least that portion of its circumference which is opposite the cam 14. The housing 20 with the cam 14 are freely rotatable about the sleeve 18, but when radial pressure is applied thereto by the resistance of the brake-band and the roller 12 against the cam 14, a considerable amount of friction is produced between said housing and said sleeve. The entire ratchet clutch mechanism is inclosed to retain lubricant, and the housing 20 also preferably incloses the sleeve 18, so that the rubbing surfaces of these two parts can be properly lubricated to maintain a reasonably constant coefficient of friction.

In the operation of the mechanism when the lever 15 is moved downwardly to tighten the band and apply the brake, the sleeve 18 turns with the cam 14, thus offering practically no frictional resistance to the applying movement. However, upon the upward or releasing movement of the lever 15, the sleeve 18 is held stationary by the ratchet clutch mechanism within it, and the cam 14, therefore, slides over the outer surface of said sleeve. As the area of the frictional surfaces of the cam and sleeve is much greater than the area of the bearings of said sleeve upon the shaft 16, the resistance to the upward or releasing movement of the operating lever is materially increased. The area and character of said frictional surfaces, and the character of the lubricant between them, are designed to provide the desired resistance to the releasing movement of the brake.

Thus it will be readily understood that the movement of the operating mechanism is impeded upon releasing the brake, so that the danger of kick-back upon reversal of the drum is eliminated, and that this impedance or increased resistance is automatically provided and automatically overcome by the operator merely by increasing his upward pressure upon the brake lever, without necessitating the operation by him of any additional releasing device.

I claim:—

1. In a brake mechanism including a drum and a shoe, a rotary operating member, connecting means between said operating member and said shoe whereby said shoe is engaged with and released from said drum by the rotary movement of said operating member, a rotary support for said operating member, concentric and frictionally contacting therewith, said support rotating freely with said operating member during that movement which engages the brake, and means for restricting the rotation of said support during that movement of the operating member which releases the brake, whereby said operating member is caused to move relative to said support to impede said release.

2. In a brake mechanism including a drum and a shoe, a rotary operating member, connecting means between said operating member and said shoe whereby said shoe is engaged with and released from said drum by the rotary movement of said operating member, an impeding member mounted for frictional contact with said operating member, said impeding member being freely movable with said operating member during its brake engaging rotation, and means for restricting the rotation of said impeding member during the brake releasing movement, whereby the frictional resistance between said members is utilized to assist in holding the brake in engagement.

3. In a brake mechanism including a drum and a shoe, three concentric members, one being non-rotatable and the other two being independently rotatable, operating means connected with one of said members for rotating it, connecting means between said members and said shoe whereby the brake is engaged and released by the rotary movement of the operating member, automatic clutch means connecting two of said members to permit relative rotation between them during the brake engaging movement only, and cooperating frictional contact surfaces upon one of said clutch connected members and the third member, whereby the rotary movement of said brake operating member is impeded only during that portion of its movement which releases the brake.

LEROY G. GATES.